US006772159B1

(12) United States Patent
Blount et al.

(10) Patent No.: US 6,772,159 B1
(45) Date of Patent: Aug. 3, 2004

(54) SYSTEM AND METHOD FOR DISCONNECTED DATABASE ACCESS BY HETEROGENEOUS CLIENTS

(75) Inventors: Marion L. Blount, Mahopac, NY (US); Hui Lei, Scarsdale, NY (US); Carl D. Tait, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/511,974

(22) Filed: Feb. 24, 2000

(51) Int. Cl.[7] .......................... G06F 17/30; G06F 7/10; G06F 17/00
(52) U.S. Cl. ........................ 707/10; 707/101
(58) Field of Search .................. 707/10, 101

(56) References Cited

U.S. PATENT DOCUMENTS

| | | | | | |
|---|---|---|---|---|---|
| 5,576,965 | A | * | 11/1996 | Akasaka et al. | 700/97 |
| 6,044,205 | A | * | 3/2000 | Reed et al. | 395/200.31 |
| 6,122,627 | A | * | 9/2000 | Carey et al. | 707/4 |
| 6,343,295 | B1 | * | 1/2002 | MacLeod et al. | 707/103 |
| 6,356,937 | B1 | * | 3/2002 | Montville et al. | 709/206 |
| 6,389,422 | B1 | * | 5/2002 | Doi et al. | 707/10 |
| 6,446,092 | B1 | * | 9/2002 | Sutter | 707/203 |
| 6,574,617 | B1 | * | 6/2003 | Immerman et al. | 707/1 |

OTHER PUBLICATIONS

H.Lei, Kang-Woo Lee, M. Blount, C. Tait, "Enabling Ubiquitous Database Access with XML", First International Conference on Mobile Data Access, pp. 1–15, Dec. 1999.
H. Lei, M. Blount, C. Tait, "DataX: an Approach to Ubiquitous Database Access", 2nd IEEE Workshop on Mobile Computing Systems and Applications, pp. 1–10, Feb. 25–26, 1999.
Extensible Markup Language (XML) 1.0 Specification, pp. 1–36, Oct. 1, 1998, http://www.w3c.org/TR/REC-xml.
Document Object Model (DOM) Level 1, pp. 1–118, Feb. 10, 1998, http://www.w3c.org/TR/REC-DOM-Level-1.
XML Linking Language XLINK, W3c Working Draft, pp. 1–31, Mar. 3 1998, http://www.w3c.org/TR/WD-xlink.
JDBC Technology, pp. 1–57, Jan. 10, 1997, http://java.sun.com/products/jdbc/index.html.
E.F. Codd, "A Relational Model for Large Shared Data Banks", Communications of ACM, 13:6, pp. 377–387, Nov. 1970.

(List continued on next page.)

*Primary Examiner*—Wayne Amsbury
*Assistant Examiner*—Cindy Nguyen
(74) *Attorney, Agent, or Firm*—F. Chau & Associates, LLC

(57) ABSTRACT

There is provided a system and method for representing a data subset of server data. According to the method, a folder definition is generated for the data subset. The generation of the folder definition includes the substeps of identifying portions of the server data to be included in the data subset, generating declarations of value constraints and usage constraints with respect to at least some of the data of the data subset, and generating parameters to be supplied or selected by a user of a client device for further identifying the portions of the server data to be included in the data subset. The declarations are used for enforcing the value constraints and the usage constraints in subsequent renderings of the data subset on a client device. A folder instance is then generated based on the folder definition and parameters provided by a user of a client device or by default. The provided parameters (user provided or default) correspond to the generated parameters. The generation of the folder instance includes the substeps of generating the data subset from the identified portions of the server data and the parameters, and including the declarations of value constraints and usage constraints in the folder instance with the data subset.

31 Claims, 9 Drawing Sheets

OTHER PUBLICATIONS

H. Garcia–Molina, T. Allan, B. Blaustein, R.M. Chilenskas, D.R. Ries, "Data Patch: Integrating Inconsistent Copies of a Database after Partition", Proceedings of the 3rd Symposium on Reliability in Distributed Software and Database Systems, pp. 38–44, IEEE, Oct. 1983.

J.J. Kistler, M. Satyanarayanan, "Disconnected Operations in the Coda File System", ACM Transactions on Computer Systems, 10(1), pp. 3–25, Feb. 1992.

A. Demers, K. Peterson, M. Spreitzer, D. Terry, M. Theimer, B. Welch, "The Bayou Architecture: Support for Data Sharing among Mobile Users", Proceedings of the IEEE Workshop on Mobile Computing Systems and Applications, Santa Cruz, CA, pp. 1–6, Dec. 1994.

B. Noble, M. Satyanarayanan, D. Narayanan, J. Tilton, J. Flinn, and K. Walker, "Agile Application–Aware Adaptation for Mobility", Proceedings of the 16th ACM Symposium on Operating System Principles, pp. 276–287, Saint Malo, France, Oct. 1997.

A.M. Keller, T. Ahmad, M. Clary, O. Densmore, S. Gadol, W.Huang, B. Razavi, R. Pang, "The DIANA Approach to Mobile Computing", Mobile Computing, T. Imielinski and H.F. Korth, editors, pp. 651–669, Kluwer Academic Press, Jan. 1995.

A. Fox, S. Gribble, E. Brewer, E. Amir, "Adapting to Network and Client Variability via On–Demand Dynamic Distillation", Proceedings of the 7th International Conference on Architectural Support for Programming Languages and Operating Systems (ASPLOS), pp. 160–170, Cambridge, Massachusetts, Oct. 1996.

M. Butrico, H. Chang, A. Cocchi, N. Cohen, D. Shea, S. Smith, "Gold Rush: Mobile Transaction Middleware with Java–Object Replication", Proceedings of the 3rd Conference on Object–Oriented Technologies and Systems, Portland, Oregon, pp. 1–11, Jun. 1997.

* cited by examiner

```
201 <!DOCTYPE folderDef SYSTEM "folderDef.dtd">
202 <folderDef name="visits">
203   <parameters>
204     <parameter name=":nurse_id">
205   </parameter>
206   <data database="pms">
207     <table name="patients" schema="pms">
208       <columns names="ssn name age address physician"/>
209       <condition>"visiting_nurse=:nurse_id"</condition>
210     <table name="physicians" schema="pms">
211       <columns names="id name phone office"/>
212       <condition>"physician=id"</condition>
213     </table>
214   </table>
215   </data>
216   <operations>
217     <insert>
218     <modify columns="age address"/>
219   </operations>
220   <constraints>
221     <range column="age" ge="0" le="110"/>
222   </constraints>
223 </folderDef>
```

FIG. 2A

```
301  <!ELEMENT data (table)>
302  <!ATTLIST data
303           instance CDATA #IMPLIED
304           database CDATA #REQUIRED>
305  <!ELEMENT table (columns, condition?, table*)>
306  <!ATTLIST table
307           table CDATA #REQUIRED
308           schema CDATA #IMPLIED>
309  <!ELEMENT columns (column)+>
310  <!ELEMENT condition (#PCDATA)>
311  <!ELEMENT column EMPTY>
312  <!ELEMENT column name CDATA #REQUIRED>
```

FIG. 2B

```
401 <!DOCTYPE folderInstance SYSTEM "folderInstance.dtd">
402 <folderInstance name="visits">
403   <operations>
404     <insert/>
405     <modify columns="age address"/>
406   </operations>
407   <constraints>
408     <range columns="age" ge="0" le="110"/>
409   </constraints>
410   <dataSet>
411     <table name="patients">
412       ...
413     </table>
414     <table name="physicians">
415       ...
416     </table>
417   </dataSet>
418 </folderInstance>
```

FIG. 3A

```
411  <table name ="patients">
501    <primaryKey columns="ssn"/>
502    <columns>
503      <column name="ssn" type="VARCHAR"/>
504      <column name="name" type="VARCHAR"/>
505      <column name="age" type="INTEGER"/>
506      ...
507    </columns>
508    <records>
509      <row id="patients:210-95-7638">
510        <ssn>210-95-7638</ssn>
511        <name>Bill Smith</name>
512        <age>35</age>
513        ...
514        <linkGroup>"physicians"
515          <link href="#physicians:99">99</link>
516        </linkGroup>
517      </row>
518      <row> ... </row>
519      ...
520    </records>
413  </table>
```

FIG. 3B

```
414 <table name="physcians">
601   <primaryKey columns="id"/>
602   <columns> ... </columns>
603   <records>
604     <row id="physcians:99">
605       <id>99</id>
606       <name>Sidney Winter</name>
607       ...
608     </row>
609   </records>
416 </table>
```

FIG. 3C

SYSTEM AND METHOD FOR DISCONNECTED DATABASE ACCESS BY HETEROGENEOUS CLIENTS

FIELD OF THE INVENTION

This invention relates generally to the replication of a data subset of server data for use on a client device while the client device is disconnected from the server. In particular, the invention relates to methods for providing the data subset to the client device, and rendering the data subset on the client device using a generic data renderer.

BACKGROUND OF THE INVENTION

Each day, enterprises as small as the corner shoe store and as large as multinational congomerates generate new data and access existing data that are vital to the ongoing viability of the enterprise. Technology advances in hardware and software have made it possible to amass and manage large amounts of data. All aspects of an organization's activities are captured and stored in databases. Examples of such activities include sales, service, product development, advertising, personnel, benefits, education, and research. Storing data on computer systems makes it easier to gather the data, query and access the data, and to automate processes that use the data.

The enterprise data are maintained on computer systems called data servers, hereinafter, referred to as servers. Large servers are maintained by a professional staff and are housed in physically secure places. Smaller servers may be under the control of individuals and small groups and may be located in places like offices and laboratories.

Servers are located on computer networks and users access the data on the server from access points on the network. Users access the server over the network through the use of a client device (computer) which may have a permanent access point, like a desktop computer with a network interface, or a temporary access point, like a dial-up link to a network interface service. Using computer networks, it is just as easy to access a data server located down the hall as it is to access a data server located half way around the world.

There are various types of databases used by data servers. One type of database is referred to as a relational database. The relational database approach was introduced by E. F. Codd, in "A Relational Model for Large Shared Data Banks", Communications of ACM, 13:6, pp. 377–387, 1970. A contemporary example of a relational database is IBM's DB2.

The relational database model offers programmers a simplified view of data. The basic unit of organizing the data is a database table. A database table is two-dimensional array. Each row is a database record, or a logical collection of data. The columns represent fields in a record. There has evolved a rich set of query APIs called the Structured Query Language (SQL), which can be used to query and manipulate the rows (records) and columns (fields of a record) of a database table. It is even possible to form relations on multiple tables.

Relational DBMS (database management systems) record information necessary for operation in a group of system-supplied tables referred to as a "catalog". The catalog stores information about the data the DBMS is managing, which is referred to as "meta" data. For example, a catalog records the names of tables stored within a DBMS, the names of the users who have been granted access to the tables, and other data. The database meta data is created within the database system and is used extensively by the database system administrators. Database programmers are given limited programming access to some of the data. For example, the data types of columns in a table can be obtained. Relational database management systems are described further by Bontempo et al., in Database Management Principles and Products, Prentice Hall, 1995.

A relational database system is a simplified form of a general multi-level data system. In a relational database system, fields are the elements of rows, rows are the elements of the tables, and tables are the elements of the database system. However, another type of database referred to as an object database can have arbitrary levels since objects can be embedded in objects. At each level, the permissible operations are defined as a part of the object. An object database is a more general example of a multi-level data system.

There are two modes in which client devices use server data. In the first mode, the client remains connected to the server for the entire time the client is accessing and using server data. There are a number of techniques for optimizing the performance in this mode. Examples include data caching at the client, prefetching data, and replicating data at the client. An important point about this mode is that if, at a certain step in the computation, the client needs data from the server in order to proceed in the computation, the client merely needs to issue a data fetch request to the server.

In the second mode, the client uses the data while disconnected from the server. First, the client must specify and fetch all of the data needed for use during the period of disconnection. This is called hoarding. Next, the client disconnects from the server. During the period of disconnection, the user may use the data on the client in a variety of ways. These include creating new data elements, modifying the data, and referencing the data. Lastly, the client must at some point connect to the server to perform synchronization. This action integrates the client replica of the data with the server data. The first access mode and the second mode are hereinafter referred to as connected data access mode as disconnected data access mode, respectively.

Disconnected data access is becoming an increasingly important mode of access. Many industries employ mobile workers who perform a significant part of their work away from the office. Examples include insurance agents, visiting nurses, and field service technicians. Corporations are re-engineering their work processes to put workers in the field and on the factory floor where they respond much faster to customer and corporate needs. As the population of the mobile work force rapidly grows, it is becoming increasingly important for enterprises to extend information and applications to their mobile workers.

When this trend first started, the client device of choice was a notebook computer running a WINDOWS operating system. One advantage of this client device was that it was basically the same software environment as that employed on the user's desktop or office computer. Since the software environment was similar, it was easy for the user to go between using applications and data in connected mode in the office and using the applications and the data in disconnected mode on the notebook.

New client device types are constantly emerging. Hand-held computers, personal digital assistants (PDAs), smart phones, and clam shell notebooks are some of the new client devices that are available today. When compared to standard notebook computers, these new devices have a smaller form factor, a lower cost of ownership, and are easier to use. All of these factors are leading to rapid acceptance of these devices as client devices by mobile workers.

These new client devices have significantly less resources than notebook computers or desktop personal computers (PCs). Currently, the total amount of memory,and storage on some of these devices is less than 10 Megabytes. On desktop PCs, total memory and storage can easily exceed gigabytes. The display size on some of these new client devices is less than 2 inches by 2 inches. The operating systems on the new client devices are all different from the operating system on desktop PCs. As a result of these factors, desktop PC application generally cannot be directly ported to handheld computers, cell phones, or PDAs.

Given the variety of device types and the different brands within a device type, users will use a diverse set of device types as client devices. Even when the information system staff of an enterprise has the authority to impose device usage, it will not be in their best interests to do so.

A description of the prior and current state of the art in connected and disconnected access to databases will now be given. In the early days of computing, users interacted with databases through the use of terminals connected to the computer. The computer was a mainframe or minicomputer that was maintained by a systems staff. The database system ran as an installed system application on the computer. Users accessed the data through an application program, like an accounting application, which made calls on the database system. The terminal interaction itself was part of the application. When on and active, the terminals were connected to the computer. This model of database access existed on both mainframes and minicomputers. Disconnected database access did not exist in this model. The client devices, which were the terminals, were not capable of operating independently of the host computer.

Personal computers (PCs) and local area networks (LANs) ushered in a new era of computing called client server computing. PCs had enough computational power and resources to execute the graphical user interface (GUI) of most applications. In fact, PCs were capable of performing a richer set of user interactions than that previously possible on terminals. A significant amount of benefit was obtained in moving the GUI functions to PCs. The mainframe or minicomputer was called the server since it now "served" a set of LAN connected PCs. The servers were reliable and scaleable. There had always been an interface between the GUI portion of the application and the database access portion of the application. In client server computing, that interface now was a function call interface across a network. The result of database calls to a server were instantiated on the client device, the PC, as temporary program data. Disconnected database access was not possible in this computing model.

As PC technology evolved, mobile PCs were created. In general, there are three main requirements for a mobile PC. First, the PC has to be light enough in weight so a person can easily carry it from place to place. Second, it has to compact enough in size so as not to be too cumbersome to carry from place to:place. Third, the mobile PC has to be able to operate on battery power long enough to do something of interest for a user. With a mobile PC, it was now possible to operate a mobile PC in connected mode while it was connected to a computer network and then operate the same PC in disconnected mode while it is disconnected from the computer network.

Database applications could not operate in disconnected mode without additional client database software. The first instances of client server database systems assumed the client was always connected to the server. In general, the database system calls generated in the client node resulted in interaction with the server node. Two new elements had to be added to the client database software in order to support disconnected operation of database application on the client. First, a database server has to be installed on the client. This is called the local server and the other server is now called the primary server. Next, the portions of the main database needed by the local applications has to be replicated on the client system. A local replicator is needed on the client to interact with the replication service on the primary server. With the local server and the local replicator, the client system is now capable of disconnected operation.

However, the current state of disconnected operation has several disadvantages. For example, the software systems that enable disconnected operation do not support a broad set of client devices and a broad set of server data systems. Further, for each set of data to be used in disconnected operation, a client specific application is required to view the data and control user interaction with the data. Accordingly, it would be desirable and highly advantageous to have a method and system for disconnected operation of a client device with respect to a server database that overcomes the above deficiencies of the prior art.

SUMMARY OF THE INVENTION

The present invention is directed to methods for replicating a subset of a database to a set of heterogeneous client devices, where a user on a specific device can use device-specific renderer client software to view and interact with any data set. The user may then connect to the server and have the client replica, which is possibly modified, integrated with the server database.

According to a first aspect of the present invention, there is provided a method providing data subsets of server data to a plurality of heterogeneous client devices. The method includes the step of identifying portions of the server data to be included in each of the data subsets. Declarations of value constraints and usage constraints with respect to at least some of the data of at least some of the data subsets are provided. Each of the data subsets is generated so as to be associated with the respective declarations. Each of the data subsets is rendered on the plurality of heterogeneous client devices so as to enforce the respective declarations of the value constraints and the usage constraints.

According to a second aspect of the present invention, there is provided a system for providing portions of server data to a plurality of heterogeneous client devices. The system includes a declaration generating device adapted to generate declarations of value constraints and usage constraints with respect to at least some of the data of at least some of a plurality of data subsets corresponding to the portions of the server data. A subsetting device is adapted to generate the plurality of data subsets so as to be associated with the respective declarations. A browser is adapted to render each of the plurality of data subsets on the plurality of heterogeneous client devices so as to enforce the respective declarations of the value constraints and the usage constraints.

These and other aspects, features and advantages of the present invention will become apparent from the following detailed description of preferred embodiments, which is to be read in connection with the accompanying drawings.

BRIEF DESCRIPTION OF THE DRAWINGS

FIG. 2A is a diagram of a folder definition according to an illustrative embodiment of the present invention;

FIG. 2B is a diagram illustrating an DTD definition of the data section of a folder definition according to an embodiment of the present invention;

FIG. 3A is a diagram of a folder instance for the folder definition of FIG. 2A, according to an embodiment of the present invention;

FIG. 3B is a diagram illustrating the "patients" table of FIG. 3A in further detail, according to an embodiment of the present invention;

FIG. 3C is a diagram illustrating the "physicians" table of FIG. 3A in further detail, according to an embodiment of the present invention;

DETAILED DESCRIPTION OF THE PREFERRED EMBODIMENT

Figure 1:
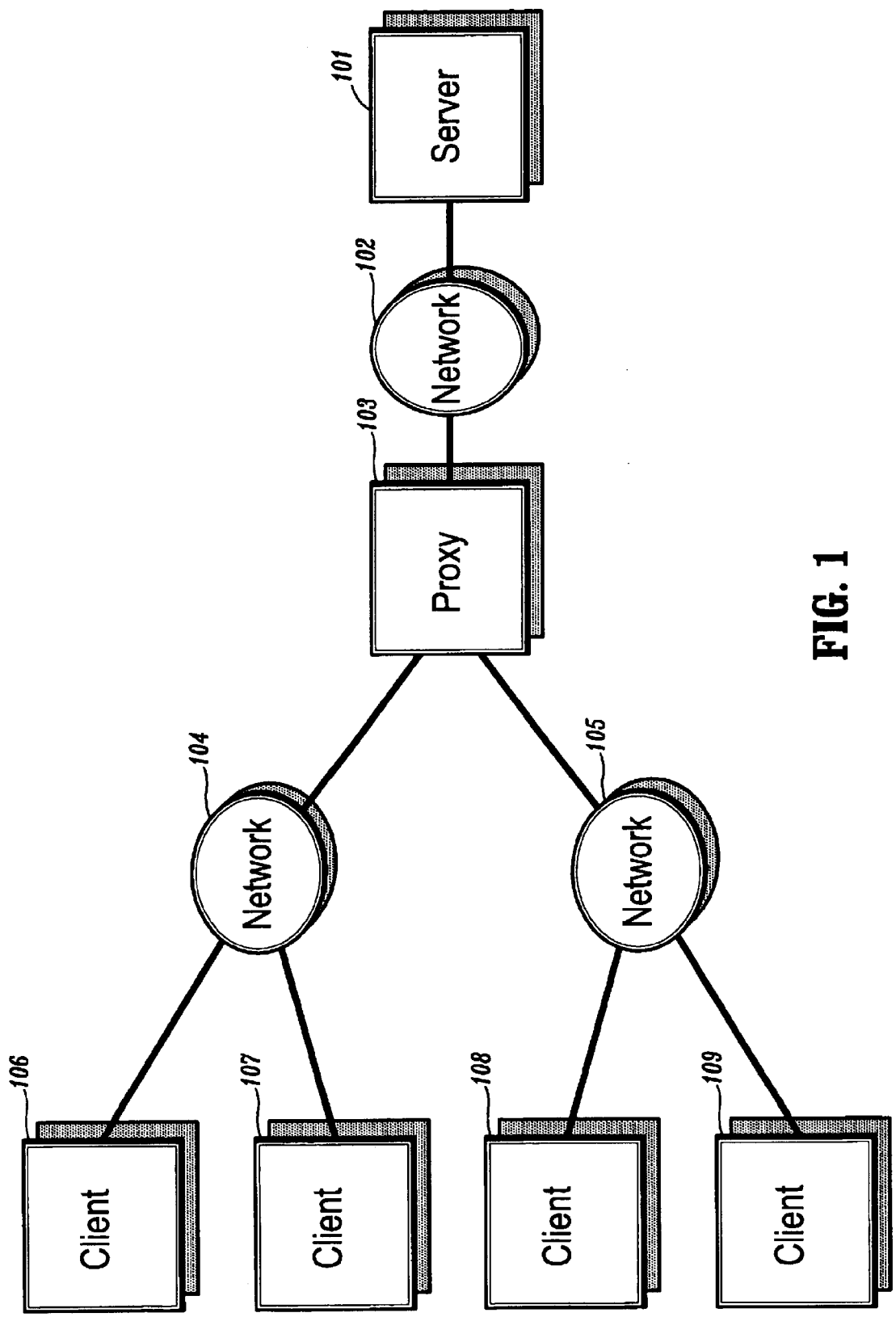
FIG. 1 is a diagram illustrating a computer processing system 100 to which the present invention may be applied.

FIG. 1 is a diagram illustrating a computer processing system 100 to which the present invention may be applied. The system 100 includes the following three tiers: server; proxy; and clients. The system 100 also includes the means to connect the three tiers. The server tier includes at least one backend server (hereinafter "server" 101). The proxy tier includes at least one proxy server (hereinafter "proxy" 103). The client tier includes at least one, but preferably multiple, clients (hereinafter "clients" 106–109).

The elements selected and described with respect to system 100 are for illustrative purposes. Thus, other types of these elements may be readily employed in accordance with the present invention, while maintaining the spirit and scope thereof. For example, the networks (104, 105) described below with respect to FIG. 1 may be wireless, wired, Local Area Networks (LANs), Wide Area Networks (WANs), and so forth. Moreover, it is to be appreciated that while inclusion of the proxy 103 is preferred in a system to which the present invention is applied, such inclusion is not mandatory. Instead, the functions performed by proxy 103 may be subsumed by the server 103, the clients 106–109, or a combination thereof. Further, in the embodiments described herein, reference is made to server 101 as being a relational database. However, it is to be appreciated that the present invention may be used with any type of data server that has a programming interface that can be used to obtain a subset of the data in the data server. Lotus Notes and object databases are examples of other data server types that may be employed in accordance with the present invention. Given the teachings of the present invention provided herein, one of ordinary skill in the related art will contemplate these and other elements and variations thereof with respect to the system of FIG. 1

As previously stated, the server 101 is a relational database server. The server 101 may be a single computer (with processor(s), memory, disks, and network interfaces) or a network of computers. To the entities that use it, the server 101 looks like a single logical entity. The server 101 is accessed through a network 102.

The proxy 103 contains the mobility-specific functions of the system 100, thus, relieving the server 101 from the burden of containing the same. The proxy 103 also provides support for the client devices 106–109, particularly the resource-constrained client devices, by taking on computational and administrative tasks. Moreover, the proxy 103 accommodates weak connectivity and disconnected operation via asynchronous processing and message queuing.

Users access the data in the servers through one of the clients 106–109. As shown, the clients 106–109 should have network interface hardware that enables the clients to communicate with the proxy 103.

It is to be appreciated that the present invention supports (may be used with) different types of clients on different types of networks. However, in preferred embodiments, the present invention is used with mobile clients and wireless data networks. A mobile client has a corresponding weight and size that makes it easy to transport the mobile client from place to place in, for example, a briefcase, a hand, a pocket or in a carrying case that can be worn by a user. One common type of mobile client is the notebook computer. A notebook computer is about the size of a book, can easily fit in a briefcase, and has resources comparable to desktop personal computers (PCs). Notebook computers are quintessential mobile clients.

Other types of mobile clients are handheld computers. First introduced as PC companions and personal digital assistants (PDAs), these devices are battery-powered, have a small screen, and have significantly less computational resources than a notebook computer. Notebook computers typically have ten of megabytes of memory, gigabytes of disk storage, and processor speeds of hundreds of megahertz. In contrast, the processor speeds of handheld computers are a fraction of that of notebook computers. Typical handheld computer have less than 10 megabytes of RAM and less than 10 megabytes of flash memory. It is the relative comparison between handheld computers and notebook computers that is important. It is to be appreciated that the present invention will work for all of these new reduced resource mobile clients, as well as others not explicitly mentioned but nonetheless contemplated. For the sake of clarity and brevity, reference will hereinafter be made with respect to a single client, arbitrarily chosen to be client 106. Accordingly, references to the network interconnecting the client 106 to the proxy 103 will hereinafter be made with respect to network 104.

It is to be understood that the present invention may be implemented in various forms of hardware, software, firmware, middleware, special purpose processors, or a combination thereof. The present invention is preferably implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform may also include an operating system and micro-instruction code. The various processes and functions described herein may either be part of the basic hardware, the micro-instruction code or the application program (or a combination thereof) which is executed via the operating system. In addition, various other peripheral devices may be connected to the computer platform such as an additional data storage device and a printing device.

It is to be further understood that, because some of the constituent system components and methods steps depicted in the accompanying Figures may be implemented in software, the actual connections between the system components (or the process steps) may differ depending upon the manner in which the present invention is programmed. Moreover, because some of the constituent system components and method steps depicted in the accompanying Figures may be implemented in both hardware and software, items bearing the same reference numeral may be referred to in a manner indicative of both hardware and software. Given the teachings of the invention provided herein, one of ordinary skill in the related art will be able to contemplate these and similar implementations or configurations of the present invention.

It is to be appreciated that the present invention is usable with any type of self-describing language. However, in preferred embodiments of the present invention, various elements thereof are implemented in Extensible Markup Language (XML). Accordingly, a brief description of XML will now be given. XML is a language-neutral, platform-independent language for describing tree-structured data. XML does not incorporate any features which tie it to a particular computer language, operating system, or hardware platform. For further description, of XML, see the following W3C recommendation: Extensible Markup Language (XML) 1.0 Specification, Oct. 1, 1998.

To access the elements of an XML document, one needs a tool called an XML parser, (hereinafter referred to as a "parser" or a "parser module"). The parser reads an XML document and dissects it into its base components. The parser breaks the XML document into its tree structured components and provides ways of traversing the document tree. A Document Object Model (DOM) is an Application Program Interface (API) for XML documents which is used by most parsers to allow programmers to access, insert, and delete the elements of an XML document. According to a preferred embodiment of the present invention, the document object model is described in the following W3C recommendation: Document Object Model (DOM) Level 1, Feb. 10, 1998.

One important property of DOM structure modes is structural isomorphism. According to structural isomorphism, if any two Document Object Model implementations are used to create a representation of the same document, they will create the structure model with exactly the same objects and relationships.

The XML language also includes what is referred to as a Document Type Definition or DTD. A DTD defines the elements and attributes used in an XML document as well as the relationship among them.

A description of two key data structures of the present invention will now be given. The two data structures are the folder definition and the folder instance. In preferred embodiments of the invention, the folder definition and the folder instance are Extensible Markup Language (XML) documents. Accordingly, the present invention makes use of tools for manipulating XML documents. To aid in identifying the pertinent parts of said Figures with respect to the description provided herein, some of the Figures corresponding to the folder definition and folder instance data structures are labeled numerically in ascending order from the top of the Figure to the bottom, with such labeling being disposed on the right side of said Figures,.

A description of a folder definition will now be given with respect to FIG. 2A, which is a diagram of parts of a folder definition according to an illustrative embodiment of the present invention. A folder definition is a document (e.g., an XML document) which describes a data subset of a server database. In addition to the data subset, a folder definition also includes value constraints for selected fields of the records of the data subset and a specification of the allowable operations that can be performed on the data subset records and data items within a record. In general, a folder definition includes the: following four sections: data 206–215; parameters 203–205; operations 216–219;,and constraints 220–222. The four sections will be described in detail hereinbelow.

A description of the data section of a folder definition will now be given with respect to FIG. 2B, which is a diagram illustrating an DTD definition of the data section of a folder definition according to an embodiment of the present invention. The data section of the folder definition includes a data element that specifies which columns of the database table are included in the data subset. The data element can include the following two attributes: database 304; and instance 303. The database attribute 304 of the <data> element specifies the name of the server database. The instance attribute 303 of the <data> element specifies the database instance of the server database. If the instance attribute is missing, then it is implied that its value is the same as the database attribute.

A data element may include the following two types of table elements: primary table elements; and secondary table elements. According to a preferred embodiment of the present invention, there is only one primary table element for each data element. A primary table element specifies a server database table which is the primary table for the data subset defined by the folder definition. The DTD for a primary table element may include a table element that is a child of the primary table element. This is how data from multiple database tables can be included in a data subset. These other table elements (child table elements) are called secondary table elements and the database tables they specify are called secondary database tables of the data subset defined by the folder definition. Only the data from the primary table of the folder definition is updateable. Every record of a child table must be related to at least one record of its parent table in the hierarchy. The relationship between a parent table and a child table is described in a join predicate in the element <condition> of the child's <table> element.

A table element 306 includes the following two attributes: table 307; and schema 308. The table attribute 306 and the schema attribute 308 specify the table name and schema name of a server database table, respectively.

A table element may, in turn, include the following elements: column 309; and condition 310. The condition element 310 specifies a condition which must be satisfied in order for a row in a database table to be selected. The column element 309 specifies the columns within a database table which will be included in the data subset. Together, the condition element 310 and the column element 309 specify which columns of which selected rows of a database table will be included in the data subset defined by the folder definition.

A description of the parameter section of a folder definition according to an embodiment of the present invention will now be given. The parameter section contains a list of parameters which are used along with information in the data section to specify which columns of which rows are included in the data subset defined by the folder definition. A parameter element includes a corresponding parameter name as an attribute. The normal use of the parameter is that a value for it is given by some external means; this is, external to the folder definition. For example, the user maybe prompted to supply a value for the parameter at the time the user requests a data subset from the client device. In the example of FIG. 2A, the nurse_id parameter 204 is specified.

A description of the operations section of a folder definition according to an embodiment of the present invention will now be given. The operations elements in the operations section specify what operations are allowed to be performed on the data taken from the primary table of the folder definition. According to an illustrative embodiment of the present invention, the supported operations include, for example, insert, delete, modify and sort. If <insert> is listed in the operations section of a folder definition, then data corresponding to a new record can be inserted into the primary table of the folder instance based on the folder definition. If <delete> is listed in the operations section of a folder definition, then a record in the primary table of the folder instance based on the folder definition can be deleted. The <modify> element in the operations section of a folder definition specifies the updateable columns of the primary table of the folder instance based on the folder definition. Unless specified by the modify element, the fields (or columns) of the record are read-only. The element <sort> of a folder definition contains the name of columns in the table of the folder instance based on the folder definition on which a sort function can be performed. The example folder definition of FIG. 2A shows that the insert operation (<insert> 217) is allowed and the columns "age" and "address" can be modified (<modify columns=,"age address"/> 218). Note that valid <sort>and <modify> elements must specify column names (in the primary table of the folder definition). It is to be appreciated that the above operations provided with respect to the operations section are for illustrative purposes and, thus, other types of operations may also be used. Given the teachings of the present invention provided herein, one of ordinary skill in the related art will contemplate these and various other operations that may be performed by a user of a subset of data corresponding to a server database.

The specifications in the operations section cannot grant greater data access privileges than the server database grants. The specifications in the operations section can grant privileges equal to or more restrictive than the privileges granted by the server database. For example, if the server database does not allow record deletion for the table, then the delete option cannot be allowed in the operations section of the folder definition. If the server database does not allow a field in a record to be modified, then the modify option cannot be set for the field in the folder definition.

A description of the constraints section of a folder definition according to an embodiment of the present invention will now be given. The constraints section defines some constraints on the values that "updateable" data can take. In this embodiment, constraints are range values for numeric data. The example folder definition in FIG. 2A shows that the value for the "age" column data must be greater than or equal to 0 and less than or equal to 110. The following terms will be used herein to specify permissible ranges:

eq equal
lt less than
le less than or equal to
gt greater than
ge greater than or equal to It is to be appreciated that the above constraint specifications are for illustrative purposes and, thus, other types of constraint specifications may also be used. Given the teachings of the present invention provided herein, one of ordinary skill in the related art will contemplate these and various other constraints that may be of value for a subset of data corresponding to a server database.

A description of a folder instance according to an embodiment of the invention will now be given. A folder instance is a document (e.g., an XML document) that includes the data records specified by the information in a folder definition as well as meta-information about the data records. FIG. 3A is a diagram of a folder instance for the folder definition of FIG. 2A, according to an illustrative embodiment of the present invention.

In general, a folder instance includes the following three sections: operations 403–406; constraints 407–409; and dataset 410–417. The operations section 403–406 and the constraints section 407–409 are taken from the folder definition used to generate the folder instance. Thus, it is to be noted that the operations and constraints sections of the folder definition of FIG. 2A and the folder instance of FIG. 3A are the same. The third section of the folder instance is the dataSet section. The dataSet section contains a table element for each table specified in the folder definition. As shown in FIG. 3A, the dataSet section has a table element for a "patients" table and a table element for a "physicians" table. The primary table in the folder definition is the first table element in the dataSet section.

FIG. 3B is a diagram illustrating the "patients" table of FIG. 3A in further detail, according to an embodiment of the present invention. The table elements in a folder instance include the following three elements: primaryKey 501; columns 502–507; and records 508–519. The primaryKey element of a folder instance includes a columns attribute 501. The value of the columns attribute 501 of the primaryKey element 501 is the column name of the primary key of the server database table. This is the column which has a unique value for each row in the table and is used to distinguished one row in the table from another row in the table. The combination of the table name and the value of the primary key uniquely identifies a particular database record. A table may have more than one primary key. The primary key information must be known in order for the reintegration component to work properly. In, addition, each record in a folder instance is identified by a concatenation of the values of its primary key columns. Whenever a new record is inserted into a folder instance on the client 106, the columns that constitute primary keys should be known.

The columns element of a table element in a folder instance has attributes that specify some schema information on the columns from the server database table that are included in the folder instance. As shown in FIG. 3B, the column name 503–505 and data type 503–505 are specified for each column of a folder instance. The column name information will be needed by the reintegration module described below to update the server database table. The type information will be used by the client to interpret the data contained in the row elements, as described hereinbelow.

The records element of a table element in a folder instance includes a set of row elements. There is a row element for each row in the server database table from which data was selected as defined by the folder definition. A row element has the attribute id. The id attribute corresponds to an identifier for the corresponding folder instance record. The id is the concatenation of the server database table name and the primary keys for that table. In our example, the table name is "patients" and the primary key value is the social security number "210-95-7638". Thus, as shown in FIG. 3B, the row id is "patients; 210-95-7638" 508. A row element also contains elements whose "tag" names are the column names from the columns element of the table element. In our example, data is taken from the "ssn", "name", "age" and "address" columns of the "patients" table. Accordingly, there is an ssn element 509 whose value is a social security number, a name element 510 whose value is a patient's name, and an age element 511 whose value is the age of the patient.

According to a preferred embodiment of the present invention, correlation between records from different tables are expressed using the hypertext linking capability of XML Linking Language. XLL is described further at: The World Wide Web Consortium. XML Linking Language (XLL), W3C Working Draft 3-March-1998. A source record contains link groups. Each link element 515 in a link group 514–516 points to target records. Each link element 515 specifies the primary key value of the target in its text, and the row id in the ref attribute. For each source record, link elements 515 that describe target records from the same table are grouped within a linkGroup element 514–516. In terms of XLL, a link is a locator element and a linkGroup is an extended element. The use of extended/locator links allow arbitrary record correlations (1-1, 1-N, N-1).

There are a number of ways of generating a: folder definition. In the preferred embodiment, since the folder definition is an XML document, an XML editor can be used to create the folder definition. A word processor can also be used. A GUI-based application especially designed to folder definition can also be used. The creator of a folder definition must adhere to predefined rules so that the folder definition document is a valid XML document. It is to be appreciated that the folder definitions can be created using any computer.

Figure 4:
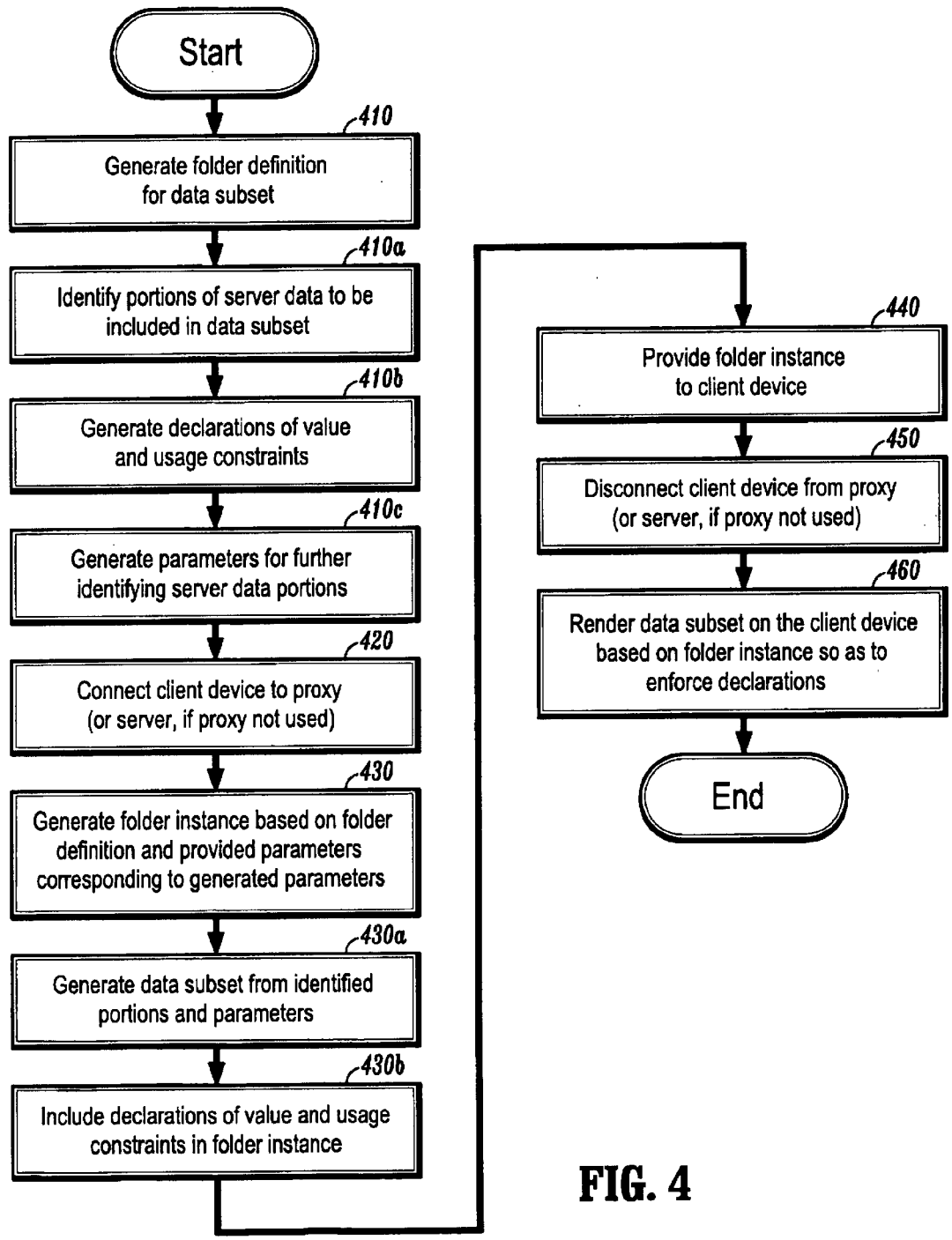
FIG. 4 is a method for representing a data subset of server data, according to an illustrative embodiment of the present invention.

FIG. 4 is a method for representing a data subset of server data, according to an illustrative embodiment of the present invention. A folder definition is generated for the data subset (step 410). The generation of the folder definition includes the substeps of identifying portions of the server data to be included in the data subset (step 410*a*), generating declarations of value constraints and usage constraints with respect to at least some of the data of the data subset (step 410*b*), and generating parameters to be supplied by a user of a client device for further identifying the portions of the server data to be included in the data subset (step 410*c*). The declarations are used for enforcing the value constraints and the usage constraints in subsequent renderings of the data subset on a client device.

The client device connects to the proxy (or the server, if the proxy is not used) (step 420). A folder instance is then generated based on the folder definition generated in step 410 and parameters provided by a user of a client device or by default (step 430). For the folder instance to be generated based on the folder definition of step 410, both types of parameters in step 430 (user provided or default) should correspond to the parameters generated in step 410*c*. The generation of the folder instance includes the substeps of generating the data subset from the identified portions of the server data and the parameters (step 430*a*), and including the declarations of value constraints and usage constraints in the folder instance with the data subset (step 430*b*).

The folder instance of the data subset is provided to the client device of the user (step 440). The client device is disconnected from the proxy (or the server, if the proxy is not used) (step 450). The data subset is rendered on the client device so as to enforce to the value constraints and the usage constraints (step 460).

Figure 5:
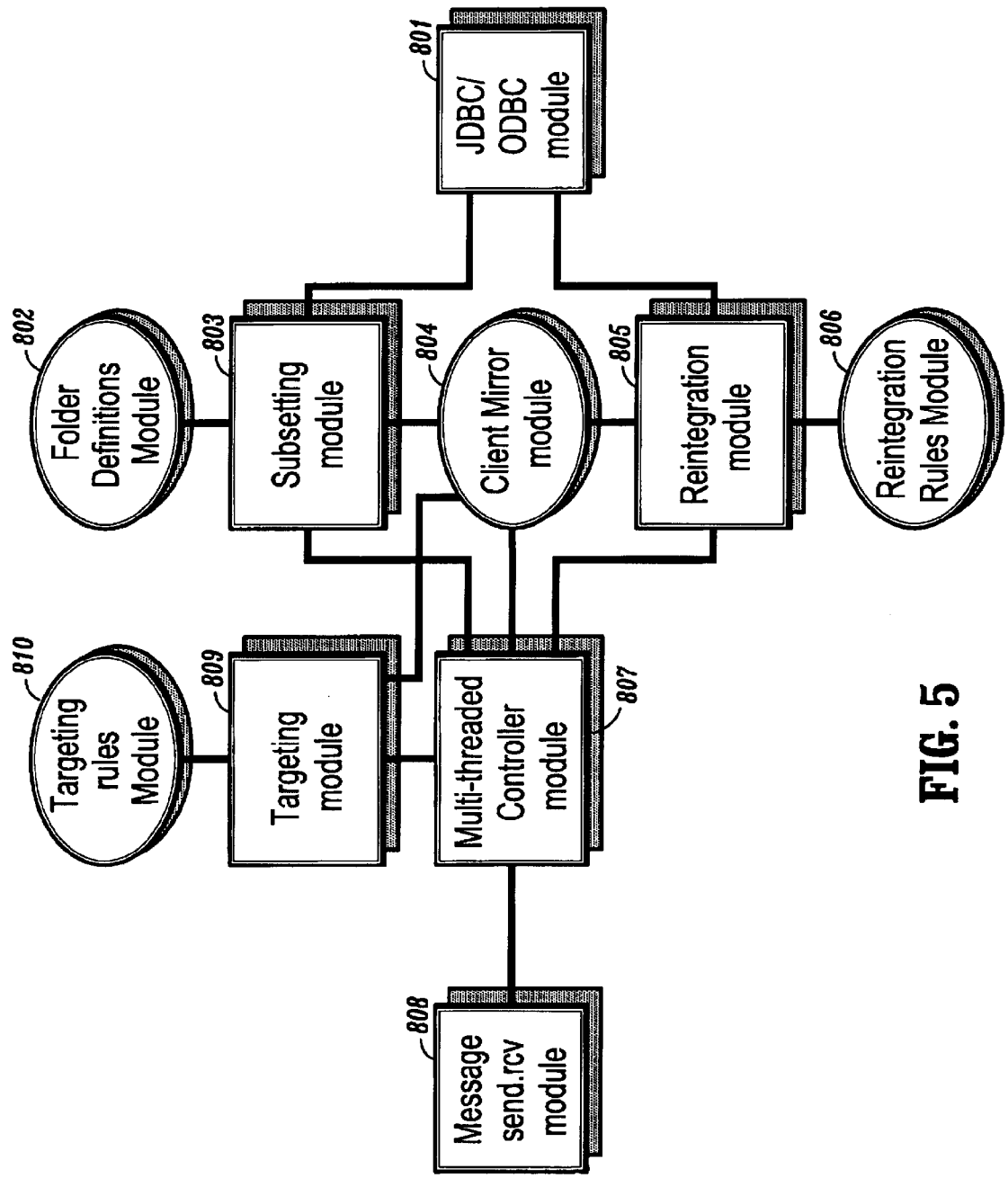
FIG. 5 is a diagram illustrating the components associated with the proxy of FIG. 1, according to an embodiment of the present invention.
Figure 6:
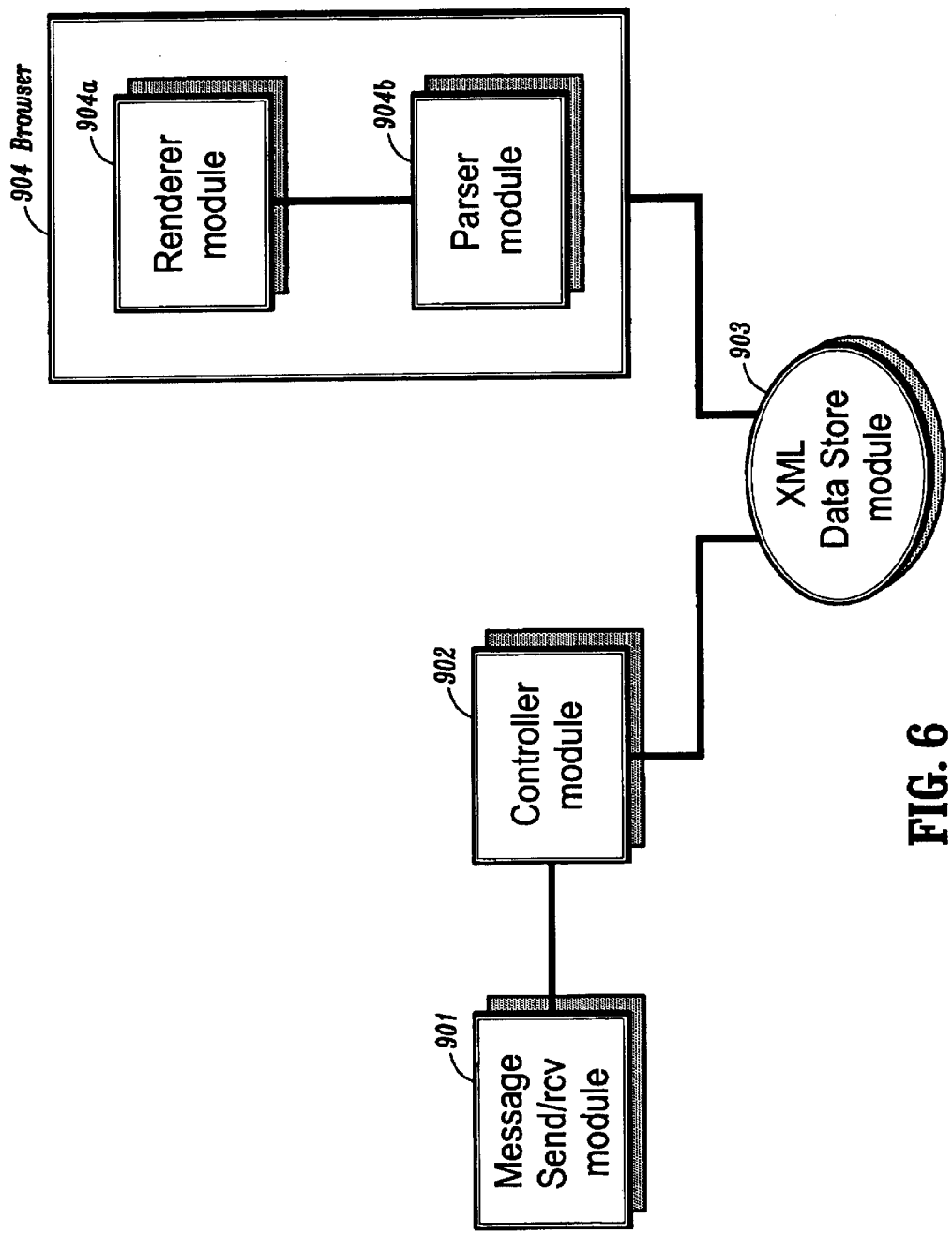
FIG. 6 is a diagram illustrating the components associated with any of the clients of FIG. 1, according to an embodiment of the present invention.

A more detailed description of the proxy 103 and the clients 106–109 will now be given with respect to FIGS. 5 and 6, respectively. FIG. 5 is a diagram illustrating the components associated with the proxy 103, according to an embodiment of the present invention. FIG. 6 is a diagram illustrating the components associated with any of the clients 106–109, according to an embodiment of the present invention. It is to be appreciated that the component associations described below with respect to FIGS. 5 and 6 are for illustrative purposes. The components may be readily reconfigured, including omitting the proxy and re-associating some or all of the proxy components with other elements of system 100, such as, for example, the server 101 and/or the clients 106–109. Given the teachings of the present invention provided herein, one of ordinary skill in the related art will contemplate these and various other configurations of the components of FIGS. 5 and 6, as well as those of FIG. 1.

The components of FIG. 5, i.e., the components of the proxy 103, are hereinafter collectively referred to as Data Access Modules (DAM) 800. The components of FIG. 6, i.e., the components of (any of) the clients, are hereinafter collectively referred to as the Data Access Client (DAC) 900.

The DAM 800 includes, a message send/rcv module (hereinafter "proxy message send/rcv module") 808 operatively coupled to a multi-threaded controller module (hereinafter "proxy controller module") 807 which, in turn, is operatively coupled to a subsetting module 803, a client mirror module 804, a reintegration module 805, and a targeting module 809. The targeting module is also operatively coupled to a targeting rules module 810. The subsetting module is also operatively coupled to a folder definitions module 802, and an Open DataBase Connectivety/Java DataBase Connectivety module (hereinafter "ODBC/JDBC") 801. The reintegration module 805 is also operatively coupled to a reintegration rules module 806 and the ODBC/JDBC 801.

The proxy message send/rcv module 808 is responsible for network adaptation, and sending and receiving messages. The proxy controller module 808 includes a set of threads which handle client requests and coordinates all units of work performed in the DAM 800. The folder definitions module 802 includes a set of folder definitions defined for the DAM 800. Folder Definitions are data files of folder definitions which are stored in a local file system or data store accessible to threads running on the proxy 103. The subsetting module 803 is responsible for generating a folder instance given a folder definition. The client mirror module 804 includes a set of folder instances stored in a local file system or data store. These are special folder instances that represent the latest replica given to the client 106. The reintegration module 805 is responsible for reintegrating the folder instance on the client 106 with the server database. The reintegration rules 806 include a set of conflict resolution rules that exist as files in local file system or data store, and are applied if conflicts are detected during the reintegration process.

The ODBC/JDBC module can be an ODBC API, a JDBC API, or a relational database product API. ODBC provides an API that can be used to access multiple database products from non-Java software environments. JDBC provides an API that can be used to access multiple database products from Java software environments. While, in our embodiment, we make the DAM relational database independent, the ODBC/JDBC module 801 can be replaced with an API to a single database product, such as, for example, IBM's DB2 and so forth. The targeting module 809 is responsible for transforming the data items in the folder instance according to a set of rules included in the targeting rules module 810.

The DAC 900 includes a message send/rcv module (hereinafter "client message send/rcv module") 901 operatively coupled to a controller module (hereinafter "client controller module") 902. An XML data store module 903 is operatively coupled to the client controller module 902 and a browser module 904. The browser module 904 includes a renderer module 904a and an XML parser module 904b.

The client message send/rcv module 901 is responsible for network adaptation, and sending and receiving messages. The client controller module 902 processes received messages, and coordinates the tasks necessary to complete the data requests generated by the user of the client 106. The XML data store module 903 includes a local file system or data store used to store the folder instances resident on the client 106. The browser module 904 is responsible for rendering the data on user interfaces of the client 106 and for controlling the user interaction.

When we say the client 106 connects to the proxy 103 or the proxy 103 connects to the client 106, we are referring to a set of activities related to establishing a valid or secure connection between the client 106 and the proxy 103. In a preferred embodiment, a login or authentication step is employed wherein the user supplies information (e.g., or account name and password) through the client 106 for validation by the proxy 103 and/or the server 101. The data exchange may be encrypted in which case encryption keys may be exchanged between the client 106 and the proxy 103. It is presumed that there is hardware and software on the client 106 and the proxy 103 for handling connection and disconnection.

The client message send/receive module 901 and the proxy message send/receive module 808 are responsible for getting a message from the local program logic and sending it across the network to the destination node. The modules 901 and 808 are also responsible for receiving a message and passing the message to the local program logic. Most clients have some options for network connection and supporting software to enable that connection. Anyone of ordinary skill in the related art can integrate the network adaptation hardware, supporting network access software, and the client software environment to enable operation of the client device on the network.

When the DAM 800 receives a request from the DAC 900, a number of computation steps may have to be performed by the DAM 800 before a response to the request can be generated. State information from one step in the computation may be needed by future steps in the computation. The proxy controller module 807 includes a set of threads. Each thread becomes associated with a unit of work within the DAM 800 and does that unit of work to completion. One unit of work for the DAM thread pool is a request from a DAC 900. To perform a request, a thread may make calls on other modules in the DAM 800. The proxy controller module 807 is a module in the DAM 800 that interfaces to the message component. This simplifies the development of the other modules in the DAM 800. The proxy controller module 807 is multi-threaded since, for performance reasons, it has to deal with multiple concurrent requests from multiple DACs. The client controller 902 serves an analogous role on the client 106.

The Open DataBase Connectivity/Java DataBase Connectivity module (ODBC/JDBC) 801 is the interface to the server relational database. Structured Query Language (SQL) became the standard relational database language. However, each relational database vendor created their own dialect of SQL. The goal of ODBC was to create a common dialect and a way to map between the common dialect and the dialects of vendor relational database management systems. Using an ODBC system and a set of vendor drivers, one can implement applications which access multiple vendor relational database management systems.

A library of functions is defined by the Open Database Connectivity interface that allows an application to access database management systems using Structured Query Language (SQL). The ODBC interface offers vendor-neutral access to different database management systems. Accordingly, an application for a virtual database can be written by an application developer and a loadable driver allowed to map the logic to the specific database management system or systems used by the application. The portability and interoperability of the application's code are attractive features of OBDC. Open Database Connectivity is further described by Signore Etaligin, in "The ODBC Solution: Open Database Connectivity in Distributed Environments", McGraw-Hill, 1994.

Java DataBase Connectivity (JDBC) is a set of Java APIs that accomplishes the same goal as ODBC. Naturally, JDBC works in a Java software environment. JDBC technology is an API that provides access to virtually any tabular data source from the Java programming language, and provides cross-DBMS connectivity to a wide range of SQL databases.

The ODBC/JDBC module 801 can be a JDBC API, an ODBC API, or an API to a database system. Server database interoperability with the DAM 800 is achieved by using either the JDBC or ODBC interface;

A description of the interaction among the modules of the DAC 900 and DAM 800 will now be given with respect to an illustrative embodiment of the present invention. User A is a visiting nurse and uses a client device while making daily visits to her customers. So, periodically, user A has to connect to the corporate proxy 103 and get a data subset of a server database that contains her customer information. There are several application scenarios under which this can happen. In one illustrative example, the nurse can connect to the proxy node 103, get a list of folder instances she is entitled to use and select from among that list. For each folder instance selected, she will be prompted for parameter information. In another illustrative example, the client can be configured with a fixed set of folder instance names and parameters. When User A connects to the proxy 103, she can be prompted to select the action she wants to take for each folder. The selection of "Get New Copy" will result in a new copy of the corresponding folder instance being generated and sent to the client.

Continuing with our example, the nurse's client device is preconfigured with a list of folders she will use to do her job. She selects the option of getting a new copy of the "visits" folder instance and connects to the proxy 103 to get the data.

The act of connection involves more than physical connection across a network. In general, the user will have to supply information such as, for example, an id and password, so the proxy 103 can verify that the user has the proper access rights with respect to the database data being requested. The corporate data base administrators will require id information so check if the user has the access rights to the database data. One way to view this is that data requests from users occur within the context of a login/logoff session. During the login phase, the connection is established and identity and access rights are determined. The session is formally ended with a logoff exchange between the proxy 103 and the client. In our embodiment, the login and logoff are handled by the unit-of-work threads of the proxy controller module 807. On the client, these tasks are handled by the client controller module 902.

User A is now past the login phase. User A selects the "patients" data subset. The client controller module 902 sends a request to the proxy controller module 807 which identifies the data subset. The proxy controller determines the folder definition that is being requested corresponding to the data subset name. In this example, the folder definition is the "visits" folder definition of FIG. 5. The proxy controller module 807 will determine that additional information is needed from the user before the request can be processed. There are several ways in which this can be done. The proxy controller module 807 may have direct access to the folder definition. The proxy controller module 807 may use an API call to query the subsetting module 803 for a copy of the folder definition. The proxy controller module 807 may issue the request to the subsetting module 803 and have the subsetting module 803 respond with a request for parameters. The "visit" folder definition specifies a nurse_id parameter. The proxy controller module 807 sends a message to the client controller module 902 requesting the parameter.

In response to the receipt of this message, the client controller module 902 prompts the user for the nurse id parameter. One way to this is to use a pop-up dialogue window in which the parameter name is given and the user supplies the value of the parameter. In our example, the nurse will input her nurse id number. The client controller module 902 sends the parameters back to the proxy controller module 807 in a message.

At this point, the thread in the proxy module controller 807, which is coordinating the processing for this request, has user id, folder definition name, and folder definition parameters. The task of generating the folder instance is given to the subsetting module 803 of the DAM 800. The proxy controller thread calls the subsetting module 803 passing it the user id, folder definition name, and the values of the folder definition parameters. The subsetting module 803 generates the folder instance, stores it as a file, places it in the client mirror module 804, and returns the proxy controller thread the reference to the folder instance in the client mirror module 804. The proxy controller thread retrieves the copy of the folder instance from the client mirror files and forwards it in a message to the client; thereby, completing the user's request.

In discussing how the folder instance is generated, it will be helpful to view how the patients table might be set up in the server database. There is a row, or database record, in the database for each customer of the visiting nurse association. The database record may include standard identification information such as, for example, name, address, phone number, social security number, insurance plan information, medical history information, physician information, and billing information. One column of each record contains an identification number of the visiting nurse assigned to that customer. If a selection is made for those rows in which the nurse column value=nurse_id parameter then we select rows corresponding to the customers of a specific visiting nurse. If we further restrict our selection of columns to those specified in the folder definition, then we have selected from the patients database table those data items that are a part of the folder instance for that visiting nurse.

The subsetting module 803 parses the folder definition document to extract the information in the folder definition. The database name, schema name, table names column names, and condition will be used to generate queries against the database tables and schema tables. From the schema tables, the queries gathers the information to form the column elements in the folder instance. Information on the data type of each table column is found in the schema tables. The operations and constraints sections of the folder instance are taken directly from the folder definition. The selected columns, from each selected row are used to form the row elements of the folder instance. The subsetting module 803 has the relevant information to form the row_id for each row (concatenation of table name and primary key). All of this information is sufficient to construct a valid folder instance document.

The correspondence between the column names in the table schema and the column names used in the folder definition must be preserved. The simplest way to do this is for the creator of the folder definition to use the same column names as in the table schema. Otherwise, the mapping should be a part of the folder definition, since if the user modifies a data element, the reintegration module 805 must update the proper data element in the database table. The row_id specifies the table and a key which identifies the row in the table the data element is in. The correct column is the missing piece of information. The XML tag is used to identify the column in this embodiment. We assume an exact mapping in this embodiment, but it is a trivial matter to include the mapping information between the data base table column name and the folder definition column name in the folder definition itself.

When the subsetting module 803 of the DAM 800 places the folder instance in the client mirror module 804, the subsetting module 803 should associate the folder instance with the user's id as well as the folder instance name. If User B connects to the proxy 103 and requests the generation of a folder instance named "visits", as did user A above, then the proxy 103 needs some way to differentiate between the two folder instances. Since the two instances are for two different users, the user name is one way to distinguish the two folder instances. The mirror copy version of the folder instance is used by the reintegration module 805 of the DAM 800 to integrate client device modifications into the server database. If the user already had a mirror copy from the previous day in the client mirror module 805, it is sufficient to mark the most recent one as the one the reintegration module 804 should use. Using the date and time of creation as the version number for a mirror copy is sufficient to remove any ambiguity about multiple copies.

Prior to transmission to the client 106, the data in a folder instance is subject to data transformation by the targeting module 809 to fit the client's characteristics and /or the user's preferences. The behavior of the targeting module 809 is controlled by a set of rules included in the targeting rules module 810. Each rule specifies an action and a condition under which the action may be triggered. The condition is a conjunction of one or more predicates, each of which tests, for example, at least one of the following:.device type, folder instance name, column name, data type, user id, and so forth. The device type information can be supplied by the user as a part of the login to the proxy 103.

There can be default rules for some common device types. For example, a rule can be to truncate the length of text data in fields to a size that limits the number of scrolls needed to view all of the data. Application developers can introduce rules that are specific to an application or folder instance. Individual users may define rules that are tailored to their own needs.

Use of the targeting module 809 is optional. The proxy controller module 807 can determine from setup information whether or not the targeting module 809 needs to be called before sending the folder instance to the client 106.

In the above example, the client 106 remains connected to the proxy 103 during the generation of the folder instance; however, it is to be appreciated that this is not mandatory. The client 106 may make the request, disconnect, later reconnect, and check on the progress of the request. The request now spans multiple login/logoff sessions. This results in more complicated state saving by the proxy controller module 807. The handling of request processing that spans multiple sessions is readily accomplished to one of ordinary skill in the related art.

The generated folder instance is sent by the proxy controller module 807 to the client 106. The client controller module 902 receives the folder instance in the message, stores the folder instance in the XML data store module 903, goes through the logoff exchange with the proxy 103, and disconnects from the proxy 103. At this point, the requested data subset, represented by the folder instance, is on the client 106, and the client 106 is not connected to the proxy 103.

User A may choose to view the data in the folder instance at that time or later. Let us assume that User A decides to view the data at a later time while disconnected from the proxy 103. When the application is started, the device renderer 904 is called to render the "visits" folder instance.

The renderer module 904*a* interfaces with the following two key components: the XML parser 904*b* and a graphical user interface-(GUI) resource library interface (not shown). The main task of the renderer module 904*a* is to display the data and to control user interaction. To do this, renderer module 904*a* will make significant use of the graphical user interface resources that are included with the client 106. Each client and its associated software environment has a set of graphical user interface resources that are made available to application developers, usually through library supported APIs. Examples of graphical user interface resources that are available for application developers are radio buttons, menus, lists, scrollbars, tables, dialogue windows, pop-up windows, and so forth. Through APIs, programmers can place these objects on windows, and determine user interactions with these objects. For example, the mouse click on an element in a list may be reported as an event through a programming API.

The differences in the areas of graphical user interface resources and the system software environment on clients are such that the browsermodule 904 is client specific. Each client (or in some cases, the client family) will have a unique implementation of the browser module 904.

In rendering the data in the folder instance, the browser module 904 should first extract information from the folder instance using the parser module 904*b*. The information in the operations and constraints sections of the folder instance may be placed in a temporary location for more efficient access while the folder instance is being rendered. The information in the columns section is used to interpret the values of data items in the row elements.

One way the data in the folder instance can be rendered is described below. The initial view will be a list of the row elements from the primary table. A field from the row element will be selected according to some criteria. That field will represent that row element in a list. The field selected should have some meaning for the user. There are numerous ways the renderer module 904*a* can determine what field to use in the list. The user could be prompted to select a field to use for the list. It could be the first field in a list of sort-able fields in the operations sections. It could be the data item corresponding to the first column in the columns sections of the folder instance.

From the list view of the table, the user can select any list element and then view the expansion of the record (or row of the folder instance) corresponding to that list element. A simple way to display the record (or row in the folder instance) is a sequence of the following:

name of column: value of column.

From our example of FIG. 3B, part of a record expansion would be the following:

ssn: 210-95-7638 name: Bill Smith age: 35

Through its control of the user interface, the renderer module 904*a* can enforce the restrictions specified in the operations section of the folder instance. If a column is specified as modifiable, its value will be rendered in an editable field. If the column is specified as not modifiable, its value will be rendered in an uneditable field. If the column is modifiable, and the user attempts to modify it, the renderer module 904*a* will check to see if the modification is subject to constraints in the constraints section.

The folder instance that is created is not dependent on the client 106. If the user made the request for a folder instance, using the same parameters on different clients, the folder instances would be the same if the server database was the same each time. The device renderer adapts the presentation of the data to the characteristics of the client. For example, given the larger screen size and computation resources, a notebook computer may display the data different from a handheld computer or may offer more rendering options than a cell phone of row We have offered a simple version of data rendering on the client 106 based on a list view of row elements and an expansion of a list element to full row view. If there are other rendering options, they would have to be implemented by the browser module 904, and a specification of what rendering option to use would have to be given in the folder instance or in another document accompanying the folder instance.

A description will now be given of how modifications made on the client 106 to a folder instance are integrated into the server database. A weak consistency strategy will be described, which only ensures that the replicas (the one on the client 106 and the server database data corresponding to the replica) eventually reach an identical state (become mutually consistent).

Let us presume that the user has made some modifications and requests a synchronization action. To start the reintegration action, the client 106 connects to the proxy 103 and sends the reintegration request. The client 106 will send a copy of the folder instance that is to be reintegrated, which will be called the reintegration request copy of the folder instance. This folder instance will be received on the proxy 103 and will be passed by the proxy controller module 807 to the reintegration module 805. In addition, the reintegration module 805 receives the name of the folder and the user id. With this information, the reintegration module 805 retrieves the most recent client mirror copy corresponding to this folder instance from the client mirror module 804. The reintegration module 805 can obtain the current values in the server database of any field of any database record. The folder instance contains the information the reintegration module 805 would need to obtain the server database values. Since the client mirror of the folder instance contains the values at the time of replication, the reintegration module 805 can determine the changes made on the client 106 with respect to a row of tables in the folder instance by comparing the sets of values. The presence of row elements in the reintegration request copy that are not in the client mirror copy indicates insertion. The absence of row elements in the synchronization request copy that are in the client mirror copy indicates deletion.

The reintegration module 805, on a row (in a folder instance) basis, determines the changes made on the client 106. If there are no conflicts, the server database is updated with the corresponding row items. If there are conflicts, the reintegration module 805 uses data in the reintegration rules module 806 to resolve the conflicts. The data items that result from the processing specified in the reintegration rules module 806 are reflected in the server database.

The reintegration rules can be generated by a number of means. Simple editors to rules generation tools can be used.

After the reintegration module 805 completes the reintegration process, it notifies the controller module proxy 807. The proxy controller module 807 then directs the subsetting module 803 to create a new copy of the folder instance for the "visits" folder instance. The subsetting module 803 completes the generation of the folder instance and places it in the client mirror module 804 and the reports the task completion to the proxy controller module 807. The proxy controller module 807 then sends the new copy of the folder instance to the client 106.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

We claim:

1. A method for representing a data subset of server data, comprising the steps of:

identifying portions of the server data to be included in the data subset;

providing declarations of value constraints and usage constraints with respect to at least some of the data of the data subset, the declarations for enforcing the value constraints and the usage constraints in subsequent renderings of the data subset on a client device;

generating an instance of the data subset based on the identified portions and the declarations, the instance comprising the identified portions of the server data and the declarations;

providing the instance of the data subset to a client device;

rendering the data subset on the client device so as to enforce to the value constraints and the usage constraints;

modifying data of the data subset rendered on the client device, subject to the value constraints and the usage constraints; and integrating client device modifications into the server data.

2. The method according to claim 1, further comprising the step of disconnecting from a server corresponding to the server data or a proxy corresponding to the server, by the client device, prior to said step of rendering the data subset on the client device.

3. A method for providing data subsets of server data to a plurality of heterogeneous client devices, comprising the steps of:

identifying portions of the server data to be included in each of the data subsets;

providing declarations of value constraints and usage constraints with respect to at least some of the data of at least some of the data subsets;

generating each of the data subsets so as to be associated with the respective declarations;

rendering each of the data subsets on the plurality of heterogeneous client devices so as to enforce the respective declarations of the value constraints and the usage constraints;

modifying data of the data subset rendered on at least one of the plurality of heterogeneous client devices, subject to the value constraints and the usage constraints; and integrating client device modifications into the server data.

4. The method according to claim 3, wherein said generating step comprises the step of generating each of the data subsets as an integrated unit with the respective declarations.

5. The method according to claim 4, wherein the integrated unit is a structured document.

6. The method according to claim 3, wherein said step of providing declarations of value constraints comprises the step of determining a range of values for at least one particular element of data.

7. The method according to claim 3, wherein said step of providing the declarations of the usage constraints comprises the step of determining permissible record level operations for a given data subset.

8. The method according to claim 7, wherein the permissible record level operations comprise insert, delete, modify, and sort.

9. The method according to claim 3, wherein said step of providing the declarations of the usage constraints comprises the step of determining permissible field level operations for a given data subset.

10. The method according to claim 9, wherein the permissible field level operations comprise insert, delete, modify, and sort.

11. The method according to claim 3, further comprising the step of disconnecting from a server corresponding to the server data or a proxy corresponding to the server, by a given client device, prior to said step of rendering a given data subset on the given client device.

12. A system for providing portions of server data to a plurality of heterogeneous client devices, comprising:

a declaration generating device adapted to generate declarations of value constraints and usage constraints with respect to at least some of the data of at least some of a plurality of data subsets corresponding to the portions of the server data;

a subsetting device adapted to generate the plurality of data subsets so as to be associated with the respective declarations;

a browser adapted to render each of the plurality of data subsets on the plurality of heterogeneous client devices so as to enforce the respective declarations of the value constraints and the usage constraints, and to modify data of the data subset rendered on at least one of the plurality of heterogeneous client devices, subject to the value constraints and the usage constraints; and a reintegration module adapted to integrate client device modifications into the server data.

13. The system according to claim 12, wherein said subsetting device generates each of the data subsets as an integrated unit with the respective declarations.

14. The system according to claim 13, wherein the integrated unit is a structured document.

15. The system according to claim 12, wherein said declaration generating device, in generating the value constraints, is further adapted to determine a range of values for at least one particular element of data.

16. The system according to claim 12, wherein said declaration generating device, in generating the usage constraints, is further adapted to determine permissible record level operations for a given data subset.

17. The system according to claim 16, wherein the permissible record level operations comprise insert, delete, modify, and sort.

18. The system according to claim 12, wherein said declaration generating device, in generating the usage constraints, is further adapted to determine permissible field level operations for a given data subset.

19. The system according to claim 18, wherein the permissible field level operations comprise insert, delete, modify, and sort.

20. The system according to claim 12, wherein at least said browser is disposed on a given client device, the given client device being disconnected from a server corresponding to the server data or a proxy corresponding to the server prior to the browser rendering a given data subset.

21. The method according to claim 3, further comprising establishing a connection between the at least one of the plurality of heterogeneous client devices and a server corresponding to the server data prior to integrating the client device modifications into the server data.

22. The system according to claim 12, wherein a connection is established between the at least one of the plurality of heterogeneous client devices and a server corresponding to the server data prior to integrating the client device modifications into the server data.

23. A method for providing a data subset of server data to a client device, comprising the steps of:

generating a folder definition corresponding to the data subset comprising data, parameters, operations, and constraints, wherein the data and the parameters specifies portions of a table to be included in the folder definition;

generating a folder instance of the data subset comprising an instance of the operations and the constraints of the folder definition, and a dataset comprising a table element for the table specified in the folder definition;

providing the folder instance to the client device;

rendering the folder instance of the data subset on the client device so as to enforce the respective declarations of the value constraints and the usage constraints;

modifying the folder instance of the data subset rendered on the client device, subject to the value constraints and the usage constraints; and integrating the folder instance of the data subset comprising client device modifications into the server data.

24. The method according to claim 23, wherein generating each of the data subsets comprises generating each of the data subsets as an integrated unit with the respective declarations.

25. The method according to claim 24, wherein the integrated unit is a structured document.

26. The method according to claim 23, wherein constraints specify a range of values for at least one particular element of data.

27. The method according to claim 23, wherein operations comprise permissible record level operations for a given data subset.

28. The method according to claim 27, wherein the permissible record level operations comprise insert, delete, modify, and sort.

29. The method according to claim 23, wherein operations comprise permissible field level operations for a given data subset.

30. The method according to claim 29, wherein the permissible field level operations comprise insert, delete, modify, and sort.

31. The method according to claim 23, further comprising disconnecting from a server corresponding to the server data or a proxy corresponding to the server, by a given client device, prior to said step of rendering.

* * * * *